(12) United States Patent
Safa et al.

(10) Patent No.: US 10,868,682 B2
(45) Date of Patent: Dec. 15, 2020

(54) SYSTEM AND METHOD FOR MONITORING USAGE OF AN ELECTRONIC DOCUMENT

(71) Applicant: Pushfor, Ltd., London (GB)

(72) Inventors: John Safa, London (GB); Lukasz Sielski, London (GB)

(73) Assignee: Pushfor, Ltd., London (GB)

( * ) Notice: Subject to any disclaimer, the term of this patent is extended or adjusted under 35 U.S.C. 154(b) by 148 days.

(21) Appl. No.: 15/918,306

(22) Filed: Mar. 12, 2018

(65) Prior Publication Data

US 2018/0323985 A1 Nov. 8, 2018

Related U.S. Application Data

(63) Continuation-in-part of application No. 15/886,172, filed on Feb. 1, 2018, now Pat. No. 10,601,600, and a continuation-in-part of application No. 15/486,397, filed on Apr. 13, 2017, now Pat. No. 9,954,689, and a continuation-in-part of application No. 14/973,606, filed on Dec. 17, 2015, application No. 15/486,397, (Continued)

(51) Int. Cl.
| | |
|---|---|
| *H04L 12/18* | (2006.01) |
| *H04L 29/08* | (2006.01) |
| *G06F 21/62* | (2013.01) |
| *H04W 4/21* | (2018.01) |
| *H04W 4/18* | (2009.01) |
| *H04L 29/06* | (2006.01) |
| *H04L 12/58* | (2006.01) |
| *G06F 16/11* | (2019.01) |
| *G06F 16/31* | (2019.01) |

(52) U.S. Cl.
CPC ........ *H04L 12/1813* (2013.01); *G06F 16/116* (2019.01); *G06F 16/313* (2019.01); *G06F 21/6209* (2013.01); *G06F 21/6218* (2013.01); *H04L 12/1822* (2013.01); *H04L 12/1859* (2013.01); *H04L 51/32* (2013.01); *H04L 63/0245* (2013.01); *H04L 67/06* (2013.01); *H04L 67/22* (2013.01); *H04W 4/18* (2013.01); *H04W 4/21* (2018.02); *G06F 2221/2101* (2013.01); *H04L 51/066* (2013.01); *H04L 63/10* (2013.01)

(58) Field of Classification Search
CPC ..... H04L 12/1813; H04L 67/22; G06F 16/93; G06F 16/9535; G06F 16/35; G06F 16/9356; G06F 16/906; G06F 16/31; G06F 16/3323; G06F 16/335
See application file for complete search history.

(56) References Cited

U.S. PATENT DOCUMENTS

| | | |
|---|---|---|
| 8,497,910 B2 | 7/2013 | Tanaka et al. |
| 8,867,779 B2 | 10/2014 | Anbalagan et al. |
| (Continued) | | |

OTHER PUBLICATIONS

Frank Olken and Doron Rotem. Random sampling from database files: A survey. In International Conference on Scientific and Statistical Database Management, pp. 92-111. Springer, 1990.

(Continued)

*Primary Examiner* — Paul E Callahan

(57) ABSTRACT

The invention is to a system and method that utilizes a user's navigation commands in order to track which portions of a document the user has viewed and to determine if such viewing habit meets a predefined viewing requirement.

31 Claims, 17 Drawing Sheets

Related U.S. Application Data which is a continuation of application No. 14/303,927, filed on Jun. 13, 2014, now Pat. No. 9,660,821.

(60) Provisional application No. 62/555,736, filed on Sep. 8, 2017, provisional application No. 62/474,693, filed on Mar. 22, 2017, provisional application No. 62/470,588, filed on Mar. 13, 2017, provisional application No. 61/945,618, filed on Feb. 27, 2014, provisional application No. 61/892,831, filed on Oct. 18, 2013, provisional application No. 61/834,838, filed on Jun. 13, 2013.

(56) References Cited

U.S. PATENT DOCUMENTS

| | | | |
|---|---|---|---|
| 9,214,136 | B1 | 12/2015 | Smailus |
| 9,660,821 | B2 | 5/2017 | Safa |
| 2002/0174010 | A1 | 11/2002 | Rice |
| 2003/0137525 | A1 | 7/2003 | Smith |
| 2003/0212745 | A1 | 11/2003 | Caughey |
| 2006/0152609 | A1 | 7/2006 | Prentice et al. |
| 2008/0022003 | A1 | 1/2008 | Alve |
| 2010/0036967 | A1 | 2/2010 | Caine et al. |
| 2010/0312793 | A1 | 12/2010 | Brown et al. |
| 2011/0040760 | A1 | 2/2011 | Fleischman et al. |
| 2011/0067087 | A1 | 3/2011 | Thornton et al. |
| 2011/0283309 | A1 | 11/2011 | Bliss et al. |
| 2011/0307804 | A1 | 12/2011 | Spierer |
| 2011/0313996 | A1 | 12/2011 | Strauss et al. |
| 2012/0136714 | A1 | 5/2012 | Nesamoney et al. |
| 2014/0143405 | A1 | 5/2014 | Pavlidis et al. |
| 2014/0327677 | A1 | 11/2014 | Walker |
| 2014/0358630 | A1 | 12/2014 | Bhagat et al. |
| 2015/0317296 | A1* | 11/2015 | Vohra .................. G06F 16/93 715/221 |
| 2016/0344828 | A1* | 11/2016 | Hausler ................ H04L 67/42 |
| 2018/0081519 | A1* | 3/2018 | Kim .................. G06F 3/04815 |
| 2019/0088149 | A1* | 3/2019 | Fink .................. G09B 5/065 |

OTHER PUBLICATIONS

Mark De Berg, Marc Van Kreveld, Mark Overmars, and Otfried Cheong Schwarzkopf. Computational geometry, pp. 95-120. Springer, 3 edition, 2000.

Avraham Margalit and Gary D Knott. An algorithm for computing the union, intersection or difference of two polygons. Computers & Graphics, 13(2):167-183, 1989.

Bernard Chazelle. Lower bounds for orthogonal range searching: I. the reporting case. Journal of the ACM (JACM), 37(2):200-212, 1990.

Radu Berinde. Efficient implementations of range trees. 2007.

* cited by examiner

Fig. 10

SYSTEM AND METHOD FOR MONITORING USAGE OF AN ELECTRONIC DOCUMENT

PRIORITY CLAIM

This is a utility patent application. This Application claims priority as a nonprovisional application to U.S. Pat. App. No. 62/555,736, filed Sep. 9, 2017, U.S. Provisional Patent Application No. 62/474,693, filed on Mar. 22, 2017 and U.S. Provisional Patent Application No. 62/470,588, filed on Mar. 13, 2017. This application claims priority as a continuation in part to U.S. patent application Ser. No. 15/886,172, filed Feb. 1, 2018, now U.S. Pat. No. 10,601,600, as a continuation-in-part to U.S. patent application Ser. No. 15/486,397, filed on Apr. 13, 2017, now U.S. Pat. No. 9,954,689, which is a continuation of U.S. patent application Ser. No. 14/303,927, filed on Jun. 13, 2014, now U.S. Pat. No. 9,660,821, issued on May 23, 2017; and as a continuation-in-part to U.S. patent application Ser. No. 14/973,606, filed on Dec. 17, 2015, which application claims priority to U.S. Provisional Patent Application No. 61/945,618, filed on Feb. 27, 2014; U.S. Provisional Patent Application No. 61/892,831, filed on Oct. 18, 2013; and U.S. Provisional Patent Application No. 61/834,838, filed on Jun. 13, 2013. All of the above recited applications are hereby incorporated by reference in their entireties for all that they teach.

FIELD OF INVENTION

The invention is to a system and method that utilizes a user's navigation commands in order to track which portions of a document the user has scrutinized.

BACKGROUND

The distribution of documents electronically has become common, such that important documents are reviewed using computers to display the document to the reader. For example, important contracts and user agreements may be displayed on a computer to a customer in order that the customer may evaluate the contractual terms of using a service or buying a product. This display may be part of a process that a vendor uses to obtain a manifestation of consent or agreement to the contract. In some cases, it's not clear whether the customer actually read the relevant terms of the agreement. In other cases, a customer may allege that the document was misleading and obscured important stated requirements or conditions to the agreement. At the same time, many electronic documents are viewable on mobile, hand-held devices like smart-phones. These devices typically have small screens that only legibly display a portion of the document at one time. As a result, in order to read the document, a customer would have to use navigation commands to move the apparent window of the display screen to show different sections of the document as the customer desires. This stream of navigation commands provides an opportunity for the party distributing the document to obtain information about a user's scrutiny of the document itself. The navigation data stream that represents the viewing habit by viewers of the document can be used by the system to detect or calculate data analytics based on such items as how long viewers stayed on a page, how long the document was open, the average viewing time, and the spread of the distribution of viewing times. The viewing habit of a particular viewer with regard to a particular document may be compared to the aggregated viewing habits of all viewers. This may be used by a business to meet regulatory compliance purposes. In addition, this aggregated data can be used to determine viewing rules that establish baseline viewing habit that is considered compliant. For example, if on average, viewers in aggregate view a particularly important page for 1 minute, but a particular viewer spends 5 seconds, the detection of the navigation data stream, in real time, can then cause the system to transmit an alert message to the viewer that they are not in compliance. Other examples are if a region of a page in the document is has no indication of having been viewed at all. In the alternative, the failure to properly view the document can be data stored in a data record for future use. The document may be comprised of a flat image file that the viewing program displays to the viewer. The system may convert a word processing data file, a presentation data file, an image, a movie or other content into the flat file that is displayed by the viewer.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

Figure 10:
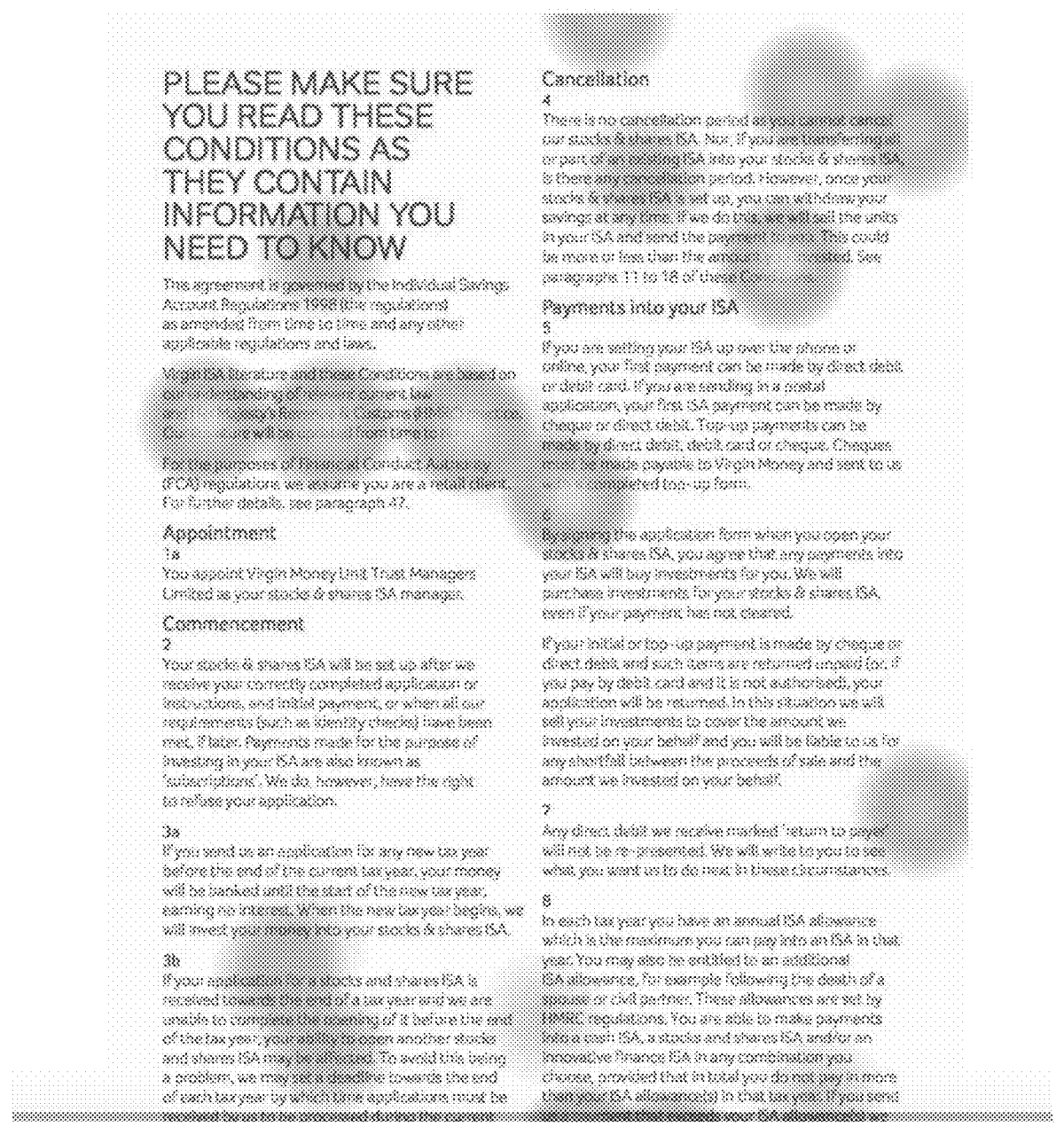

FIG. 10 Another depiction of the usage heatmap overlaying the document text.

DETAILED DESCRIPTION

Figure 1:
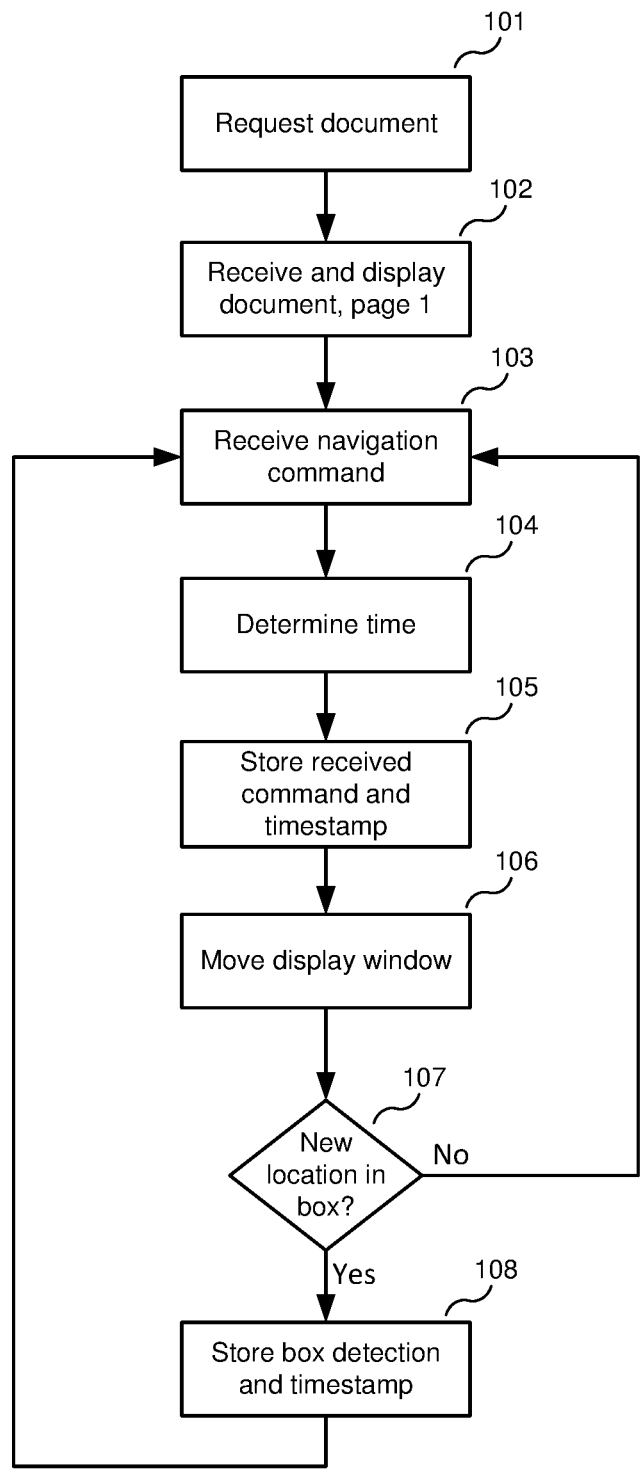
FIG. 1 Exemplary flow chart for displaying document and capturing navigation data.
Figure 2:
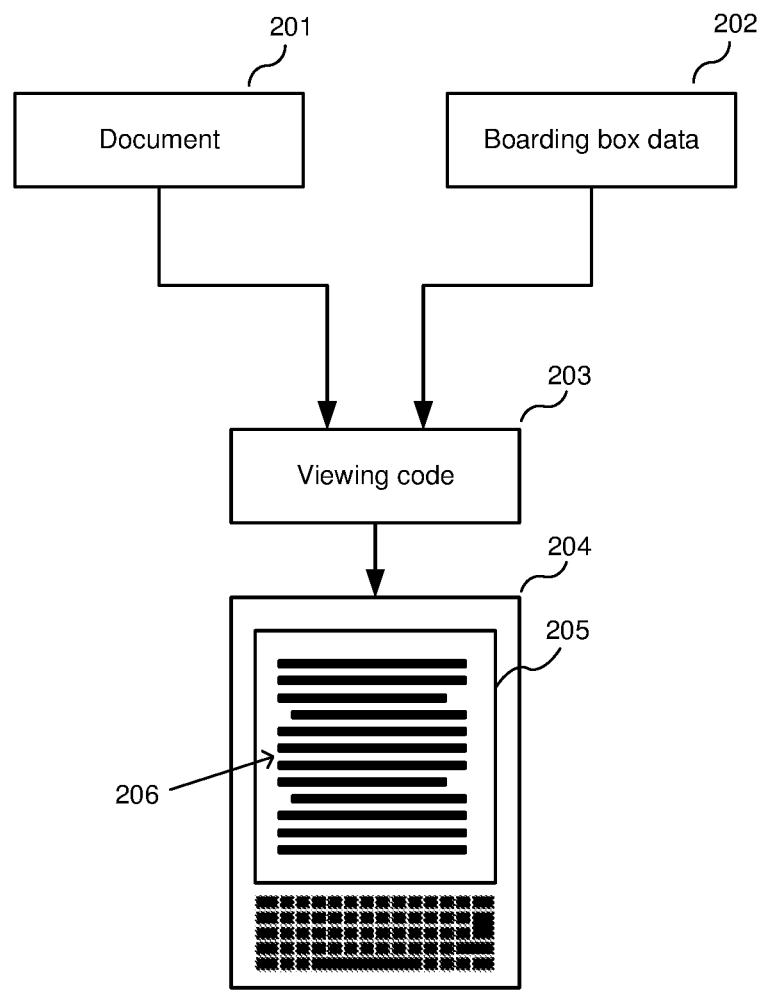
FIG. 2 Diagram showing flow of document and boundbox metadata to the display.
Figure 3:
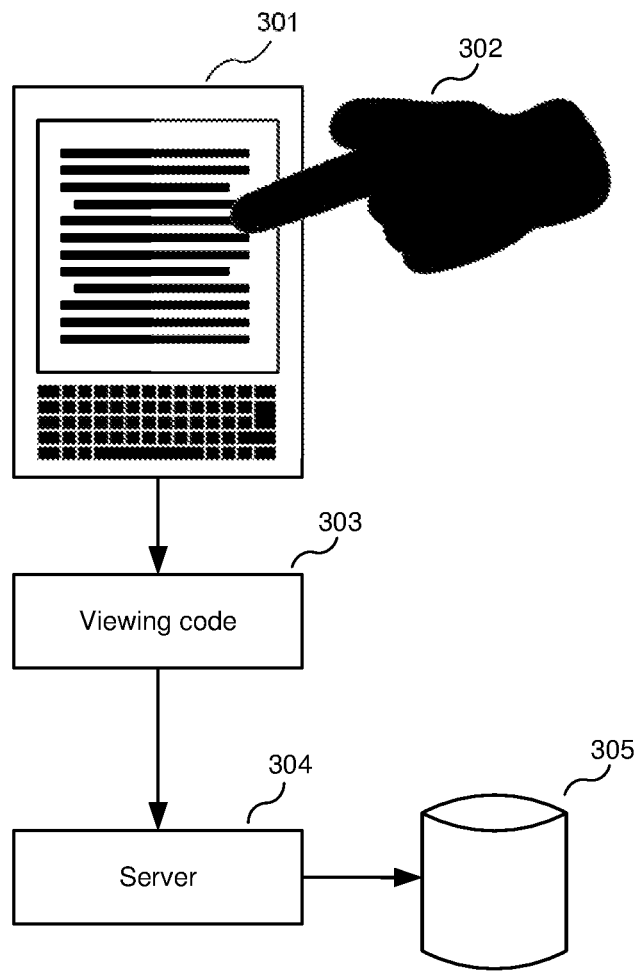
FIG. 3 Diagram showing input of navigation command data flowing out to the server.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

A document distribution system may be embodied by a server and a computer program operating on a user's mobile device. The server may be attached by a data network to a storage device where data files representing documents are stored. In one embodiment, the server operates a program that receives from a user's mobile device a request to display a document. (101) The server program verifies the request, and if valid and authorized, obtains the document from the storage device. See FIG. 1. The document is then transmitted to the requesting mobile device. (201) In one embodiment, the document is transmitted as a flat image document in an encoded format that is not usable except by an authorized program operating on the user's mobile device. A document may be a word processing file containing text, an image, an audiovisual file or a set of pages for display that contains combinations of text and images or other visual content. In this embodiment, installed on the user's mobile device is an authorized program that can receive the encoded document data, decode it, and display the decoded document on the mobile device screen. In another embodiment, the mobile device request for the document results in a payload of program code embodying the authorized program to be transmitted to the user's device. (203) In this embodiment, the authorized program is installed to operate on the mobile device and then it calls for the document. In yet another variation, the code payload embodying the authorized program accompanies the encoded document transmitted to the mobile device, either in the same transmission, or in a series of transmissions, and either by one network request transaction or more request transactions. In yet another embodiment, the server may transmit parts of a document so that the mobile device only has that portion of the document that was called for or authorized.

As a result, data representing a document or portion thereof is present on the user's mobile device. (201) At the same time, the authorized program code for viewing the document is also present on the device. (203) The viewing code can then render the document (101)(206) on the display screen of the user's mobile device. (204) The viewing code is configured by its program logic to receive from the user commands to navigate through the document. (103) (302) For example, the document may display an 8½ inch by 11 inch page of a document. (301) However, the screen of the device may be so small, the print on the document is illegible. As a result, a user may enter commands (302) into the device to zoom into the document in order to read a portion of the page. In one embodiment, the commands are entered by means of a touch screen that displays the document. In that embodiment, the gestures of the user's fingers constitute command data that the viewing code receives and uses in order to recalculate what to display on the devices screen. (302) For example, if the user touches a location on the fully displayed page, the viewing code may interpret that touch as a command to zoom into or magnify the display of the page such that the touched location is at the center of the zoomed in or magnified portion of the page. This creates an apparent window (205) for viewing the document page. The apparent window is a portion of the document page that is magnified and the window can appear to be moved around the page as a result of the user's commands to selectively display different portions of the same page. In addition, the user may want to incrementally move the apparent viewing window of the page so as to scroll down the page. Those commands may be input into the mobile device by means of the user touching the screen and dragging the touch point down the screen. Similarly, such touch and drag gestures may be used to move the apparent window up, down or side to side in order that the user may read the magnified document page. Similarly, a touch gestures, like a pinch-in or pinch-out can be used to cause the apparent window to zoom into the document region, that is to increase the magnification or zoom out, that is, to decrease the magnification. In other embodiments, the user may move a finger across a track-pad, and then press the pad to input the condition of a selection. In yet other embodiments, the user may use a mouse to move a cursor that is displayed over the document, and then engage a button on the mouse to input the condition of a selection. In yet other embodiments, the commands input by the user to adjust the display may be input by voice command to the device.

In other embodiments, the document may have internal active links. In this embodiment, there may be a table of contents that, when displayed on the mobile device, presents an interface opportunity for the user's input. In this embodiment, the user may select an entry on the table of contents as a way of commanding the viewing code to display that page of the document. In other embodiments, there may be an internal reference link that when selected by the user input, causes the viewing code to display the page or portion of a page pointed to by the reference. In one embodiment, the selection input may be accomplished by the user touching a rendering of the link on the display of the mobile device. In yet another embodiment, the selection of the link may cause the mobile device to launch a program to display a document or other content that is external to the document being displayed by the viewing code.

As a result of the user reviewing the document using the viewing code, the viewing code receives as data, all of the navigation and selection commands input by the user. This stream of data may be used in various ways. First, the viewing code maintains the command data stream comprised of navigation and selection command data. (307) This data may be stored locally on the mobile device, or may be transmitted to a remote server, or first stored locally and then transmitted to the remote server. In the case of the server receiving the command data stream from the user's mobile device, the server would store the input data stream in a database, (305) in one or more data records. Those data records may be associated with the user, whose mobile device requested the document for display and the document. In this manner, the stored command data stream is data that indicates how that user reviewed the selected document.

In yet another embodiment of the invention, the document is associated with one or more individual bounding boxes. (306) The bounding box is a set of data values that a perimeter of a region of the document. In the preferred embodiment, the bounding box is a portion of a page of the document. In other embodiments, the bounding box may be an entire page or a predetermined set of pages of the document. In many embodiments, the bounding box is represented by the x, y coordinates of a predetermined rectangle in a page in the document. The bounding box may be a logical construct and not actually displayed on the mobile device screen. In other embodiments, the bounding box may be displayed as a line, or by the region being overlayed by a color. In other embodiments, the bounding boxes define the location of regions of the document that are of interest to the document owner.

In one embodiment, a bounding box defines a perimeter (306) around a region of text comprising the displayed document region. (205) Each bounding box may be represented by a data structure that has a data value identifying the document, a data value identifying the box, and data values representing a locus in the document. In one embodiment, the data values representing the bounding box may include a page number for the page the box resides on, and then four x, y coordinates that define the location of the box on the page. Other forms of bounding box representation can be used. For example, a box may be defined by the x,y location of one point, and then two values representing a distance up or down, or left to right. In another example, a document that has predetermined numbered columns and rows for text may specify a bounding box in terms of column numbers and line numbers. Other embodiments may define a bounding box in terms of paragraph numbers. The dimensions may be either actual distances on the page, for example, in inches or centimeters, or text positions from the left or right edge of the paper (or the margins), or text lines from the top or bottom of the page (or its margins). All of these different schemes for identifying a locus on the page are examples of data values representing a locus in the document. The data structure may relate the bonding box with the some information about its substance, for the convenience of the document's owner. For example, a bounding box may be associated with test describing "Investment Risk Factors." An example of the bounding box data is presented below:

Document 123: "Newco Prospectus"
Box 1: [Page 3, (15, 20); (15, 80); (30, 10); (30, 80)], "Investment Risk Factors"
Box 2: [Page 6, (15, 60); (15, 120); (30, 60); (30, 120)], "Investor Representations"

In yet another embodiment of the invention, the viewing code, (303) when operating, responds to the command data stream input by the user in order that the user navigate and view portions of the document. (106) In one variation of this embodiment, viewing code compares the location of the regions of the document being viewed by the user with the locus of the bounding boxes in order to determine if the user is viewing text within a bounding box, and which bounding box it is. (107) This data is also stored as part of the command data stream. (108) In this embodiment, when the user inputs a series of navigation commands, the viewing code uses the command data to determine one or more of a page to display, a magnification amount and a movement of the apparent window. In addition, the viewing code can associate each command input with a time value. (104) In this manner, the viewing code can catalog all of the user's viewing habits through the document, including when those movements occurred, and store that data. (105)(307).

By way of non limiting example, if a user obtains authorization from the server to download a financial prospectus for NewCo, then the database on the server stores in a data record data representing the fact that the Newco prospectus (the document) was transmitted to the user's device at a particular date and time. The viewing code on the user's mobile device can continue to catalog such usage. (307) For example, the prospectus may include a section called "Investment Risk Factors." The viewing code may receive from the server a set of data representing the bounding boxes for that document. One of those bounding boxes may be associated with the "Investment Risk Factor" portion of the document. The user may then display the first page of the document, but not input any command to zoom in to view it. Rather, the user may then quickly input navigation commands, for example, finger strokes, to scroll down the document. The viewing code catalogs these gestures, especially the times when they are input. The user may arrive at the page titled "Investment Risk Factor" and then at that point zoom into that section. The user may then spend some time reading that section, before inputting a zoom out command followed by further navigation to other portions of the document. All of these commands are stored by the viewing code, including the associated times of the command input. These may be stored in a data structure as a list or struct or as a series of entries in a relational table in a relational database.

In yet another embodiment, the system determines if the apparent location of the display window is within a bounding box. This may be accomplished by the viewing code operating on the mobile device determining which of the bounding boxes encompasses the apparent location of the display window. For example, if the user has moved the display window so that its center is at location is on page 3, at x=20 and y=70, that center point can be determined by the computer processor to be within the perimeter of Box 1, as defined above, because x is between 15 and 30, and y is between 60 and 120. Similarly, the perimeter of the display window can be compared by the processor to the bounding box locus to determine if there is any overlap, or an overlap that is greater than a predetermine amount. As a result, each time the user inputs a navigation or magnification command, the locus of the display window is compared to the bounding boxes to determine if the display window is displaying text in a particular bounding box. In the preferred embodiment, the location of a point on the document page displayed on the device screen is in pixels, that is, the number of pixels by row and column. However, it is possible to use algebraic transformation to use actual distance on the document page as if it were a printed page, and then map that location to an apparent pixel row and column. Similarly, the document location can be a location in characters along a row for one axis, and then the number of lines for the other axis. The transform would be one or a pair of coefficients that map the location on the document page to the pixel locations that are displayed. Similarly, a location of a touch on the screen may be indicated by a pair of actual distances on the screen and then mapped to the location on the document page. Any of these representations in various combinations may be used with the appropriate algebraic transformation between them.

The most basic steps of one embodiment of the process are shown in FIG. 1, and explained below:

Step 1: receive navigation command. In this step, the user inputs commands, for example, document selection, navigation or magnification commands into the viewing code by means of actuating a user interface of their computer. In the preferred embodiment, the user uses touch gestures on the display screen of a mobile device like a smart phone.

Step 2: determine time stamp and store command data and time stamp in the command data stream data structure. The viewing code fetches a clock value from the mobile device hardware or operating system, generates a new entry into a data structure for that input command and the time stamp.

Step 3: move display window in the document to its new location or magnification. The viewing code then fetches from memory the data embodying the selected page and then renders the document page on the device, in the preferred embodiment, the viewing code generates the output data for the display. If the command is to zoom into a page that is already displayed, the viewing code fetches the data for the page, and selects the subset of that data required to render the portion of the page that is requested. The magnification command is interpreted to determine a factor and other mapping data that can relate the apparent position of the display window with the desired region of the document. Using this mapping data, rendered image data can be generated that, when displayed, is the requested region of the document at the requested magnification.

Step 4: determine whether the new boundary or centerpoint of display window overlaps any bounding box. If not, then go to Step 1. The mapping data from Step 3 can be used to determine the geometric data that defines the apparent perimeter of the display window. That data can then be used to determine if that perimeter is lies within any bounding box. If not, then the system waits for the next command to be input.

Step 5: determine if the overlap is greater than a predetermined amount. If no, go to Step 1. The system arrives at this step if there is an overlap with a bounding box. This step is optional, but may be used in one embodiment. If the amount of overlap is trivial, for example, a few characters of text, the system can optionally treat the command as if there was no overlap, and thereby go back to Step 1.

Step 6: insert into command data stream an indication that the determined bound box has been detected, and the identity of the detected bounding box. If an overlap with a boundary box is detected in Step 4, then the command data stream is updated to include an indication that the bounding box was detected, that is, which box and a time stamp. The command data stream continues to grow until the user exits the document. An example of the organized command data stream is presented below:

| | |
|---|---|
| Open document | 12:02:05 |
| Scroll down page 1 | 12:02:06 |
| Scroll down page 2 | 12:02:07 |
| Scroll down page 3 | 12:02:07 |
| Zoom in | 12:02:08 |
| Detect Bounding Box 1 | 12:02:09 |
| Zoom out | 12:03:09 |
| Close Document | 12:03:10 |

In yet another embodiment, the bounding box aspect may omitted and instead the system can track and store the navigation commands, and use that data directly. For example, if a person enters a "zoom in" command, the entry can store the x, y location of the center of the display window and a time stamp. The time stamp can indicate "am" or "pm" or use a 24 hour clock. For example, the entry in the stored command data stream could appear as:

Zoom in 25, 120 12:02:08.

In this embodiment, the bounding box could be omitted, but both techniques can also be used together.

In one embodiment, the command data stream for each user is collected by the server, by the viewing code transmitting the command data stream (307) to the server (304) over a data. This may be by means of a database (305) that stores a data record for each time the user opens the document, and in that data record is the command data stream for that session, the identity of the user and the identity of the document. Once the database has more than one user's command data stream for a document, the database may be utilized to generate more data that represents the aggregate usage of the document. For example, each time a particular bounding box is viewed, that may count for a score of 1 for that bounding box. Over a number of users who have reviewed the same document using the system, a statistical aggregation of the data can show the percentage of users who viewed a given box. In addition, the time stamp data may be used to calculate for a user viewing the box, how long they viewed the region. The aggregated data can then be used to calculate an average time and standard deviation (or some other representation of the spread of statistical values) for the amount of time a user views that particular bounding box.

This output data may also be stored in a data record in a database. (305) In this data record, the identity of the document and the identity of the bounding box are listed. The number of users who visited the selected region within the bounding can be used to determine whether addition, the determined viewing time and it standard deviation are stored in the data record. The data can be used to store that a viewer has read an important statement in the document or other item that must be reviewed, by means of the fact that the person zoomed into the region of the document with the important statement.

The output data that is stored for a user can be used by the system to evaluate the user's viewing of the document. For example, queries can be submitted to the database for the time stamp for opening the document and closing the document for a given user. This data can then be used to calculate the elapsed time the document was being viewed. Similarly, particular viewing times for specific bounding boxes in a given document may be calculated. This data may be stored in order to permit the document owner to demonstrate that a particular user did in fact review in detail a particular portion of the document, or that they failed to do so. This data can also be aggregated so that a data record stored in the data base contains information that is the average time for viewing the document or a specific bounding box. The statistical result can also include the width of the statistical curve at the standard deviation. Using this data, a specific viewing time by a specific user can be compared by the computer processor to the average viewing time of a page or region of a page, and the range of viewing times within the standard deviation or some other predetermined tolerated variation threshold. This provides a mechanism to automate the monitoring of a user's review of a document. For example, an analytical analysis can be run on a user's command stream to determine how long the user viewed a page or region, how long the document was open, and comparing these parameters to the aggregated data for the same document.

In yet another embodiment, the result of this comparison can be used by the system to select a compliance rule set, represented by a data structure in the storage system. In this embodiment, the processor determines if the user's measured viewing habit, for example, the length of time viewing a specific bounding box, or whether the box we zoomed in at all, can be used to drive program logic that then selects a compliance rule that tells the processor to transmit a message. In this embodiment, a document is associated with metadata that lists bounding boxes and expected or required viewing times for those regions in the document. For example, if a user is found to review an important part of a document for 1 second, while the average viewing time is 1 minute, this detection can trigger program logic that transmits a warning message. This message can indicate the identity of the user, the document, and the compliance failure. The message can be transmitted to the user, or, can be transmitted to another party by means of electronic messaging mechanisms. In another embodiment, the detection that a user has viewed a specific region of the document can be stored in a data record associated with the user, that is, it is a data record that can be used to prove that a user spent a certain amount of time reviewing a legal provision in the document.

In one embodiment, the message may be transmitted to a predetermined location with information noting that a specific user with a specific document had an atypical review of the document. In another embodiment, the system can transmit a message to the user that their review of the document was deficient and suggest where they should be paying attention, given the aggregated viewing habits of all users who reviewed the same document. In yet another embodiment, the data record associated with the user may be updated to indicate that the user's review of the document met or failed to meet some predetermined requirement to comply with some regulatory compliance.

In one embodiment, the aggregated data may be used to create an image that includes colors over regions of a document page, where the color in a region is an encoding of the aggregated time that the users view that region of the document. Alternatively, the actual (x, y) position of touching the document can be aggregated to create the same encoding. The processor can assign a predetermined locus of pixels to an (x, y) location on the page. Then, for each user, their command data stream can be used such that any command that is within the locus of a point (x, y) causes a tally for that locus to increment by one. In another embodiment, for any pixel (x, y), if it is within a bounding box or region that was selected or viewed by the user, the tally for that pixel is incremented by one. In yet another embodiment, tallies can be calculated for bounding boxes or bounding regions, that is, as each bounding box or region is selected, its tally is incremented by one. Then, in one pass, a color value for a pixel is determined by determining for pixel (x, y), which bounding box it is within for the displayed document page, and then the tally for that box retrieved. As a result, for a given page, the system will calculate for each pixel, a histogram indicating the number of users whose viewing habit included that location or its locus. For each pixel location in the page image plane, the associated histogram value can then be converted into a color value. The tally can then be used by a function to create a pixel color value. For example, as the tally increases, the hue may be incremented from dark blue, through green, to yellow and then red. The resulting converted histogram is then a color image. The color image can then be superimposed, with a predetermined transparency or opacity, over the image of the document page in order to display a heat-map showing where reviewers of the document spend them most time or otherwise engage the most scrutiny. This can be accomplished by adding the color pixel value to the pixel values representing the document image. The resulting image is the superimposing of the heatmap over the text of the document. The tally for a pixel, bounding box or region may be increased as a result of touches within that pixel, bounding box or region. Alternatively, the tally may be increased using the amount of time that passes before the next navigation command, indicating by a higher tally that the user spent a longer period of time at that navigational position. In addition, combinations of the two may be used as the tally, for example, a linear combination of touches and time periods.

In one embodiment, the system architecture is a server that is connected by a data network to a database, and also connect by a data network to a remote device operated by the user. In this embodiment, the server receives the document and converts it to a flat image for viewing. In the preferred embodiment, the server has received a document and converted it into an image file before transmitting to the viewing code. In other embodiments, the document in its editable form is transmitted, but it is further encoded so that the remote device cannot alter it or its layout of the text. The viewing code module is transmitted to the remote device, and the viewing code displays the document. In addition, the metadata defining the bounding boxes is transmitted to the remote device. Further, the viewing document can capture and store the command data stream, and determine the bounding box detections. The mobile device can also transmit this data back to the server in order that the data be stored in the database.

In an alternative embodiment, the viewing code displays the document, captures the command data stream, but transmits that data to the server. The server holds the meta data defining the bounding boxes locally, and then uses the received command data stream to determine whether the bounding boxes have been detected.

In yet another embodiment, the document owner or other authorized party can update the metadata defining the bounding boxes. This revised data is then input into the database and if the metadata has already been transmitted to one or more remote devices, this data is pushed out to those devices in order that their command data stream be recalculated using the revised bounding box metadata.

In another embodiment, the invention may be used to predict whether a user that is or has reviewed a document can be associated with another statistical set of users. For example, the aggregated viewing habits of many viewers of the document can be considered an N dimensional space, where each dimension represents one of the bounding boxes in the document. An example N-space is presented below, in this case, 4 dimensions because there are 4 bounding boxes in the document:
Document: No. 1.

| Viewing Time | Variance |
| --- | --- |
| Box 1: 8 secs. | 2 sec. |
| Box 2: 15 secs. | 3 secs. |
| Box 3: 45 secs. | 8 secs. |
| Box 4: 10 secs. | 3 secs. |

A specific user's viewing habit for that document then represents a point, or vector in that space. As a result, the aggregated usage habit data stored in the database may be used to define a region in the N space. An example viewer N space vector is presented, for Viewer number 1 with regard to Document number 1:
Document: No. 1
Viewer: No. 1
Viewing Time
Box 1: 9 secs.
Box 2: 14 secs.
Box 3: 49 secs.
Box 4: 9 secs.
In this example case, Viewer No. 1 exhibits a viewing habit for Document 1 that is within the expected tolerance of the typical viewer as determined by the aggregation of viewing habit data across a set of the viewers of Document 1.

Further data analysis can be used to determine the region of the N space that is occupied by viewers who meet some predetermined condition. Then, for a specific user, where it is not known whether they meet that predetermined condition, their usage vector can be used to determine if the vector occupies or is within that region or sufficiently close to the region, within a predetermined tolerance amount. If it does, it may be possible to infer that they meet the predetermined condition. As a result, users may be selectable based on their viewing habits of the document. In this embodiment, the viewing program may collect the command stream and transmits it to the server for analysis, or conduct such analysis on the user's device. In the latter case, parameters defining the N dimensional space would be transmitted to the user's device in order that the comparison be conducted on the user's device. The points defining the boundary of the N-dimensional region can also be associated with the detected standard deviation for each dimension defining the point location so that a user whose usage vector is outside the region defined by the points, but only by a distance that is within the standard deviation may be considered a sufficient match.

As a specific example, a document may be sales pitch for a specific product, like a car. It may be determined that in the N space, there is a different region for those users who ultimately visit a car show room or purchase the car that is distinct from those users who view the sales brochure but fail to visit the showroom or buy the car. If a new user downloads the brochure and views it, their command data stream can be used to determine where in the N space they reside, and thereby predict whether they are likely to come to the showroom or buy the car. As a result, the system can automatically transmit a message to a predetermined location indicating that the user should be contacted, for example, for a follow up sales call. Likewise, a new user whose location in N space is well outside the region can be stricken from a follow up call list, in order to economize on sales efforts. Another example is fraud control. It may be that aggregated viewer command stream data indicates a particular locus in N space of typical viewers of a customer agreement, while a different region is occupied by persons who turned out to submit fraudulent claims under the contract. In this way, a prospective customer can be evaluated by determining whether their viewing habit is closer to one locus or the other.

Figure 4:
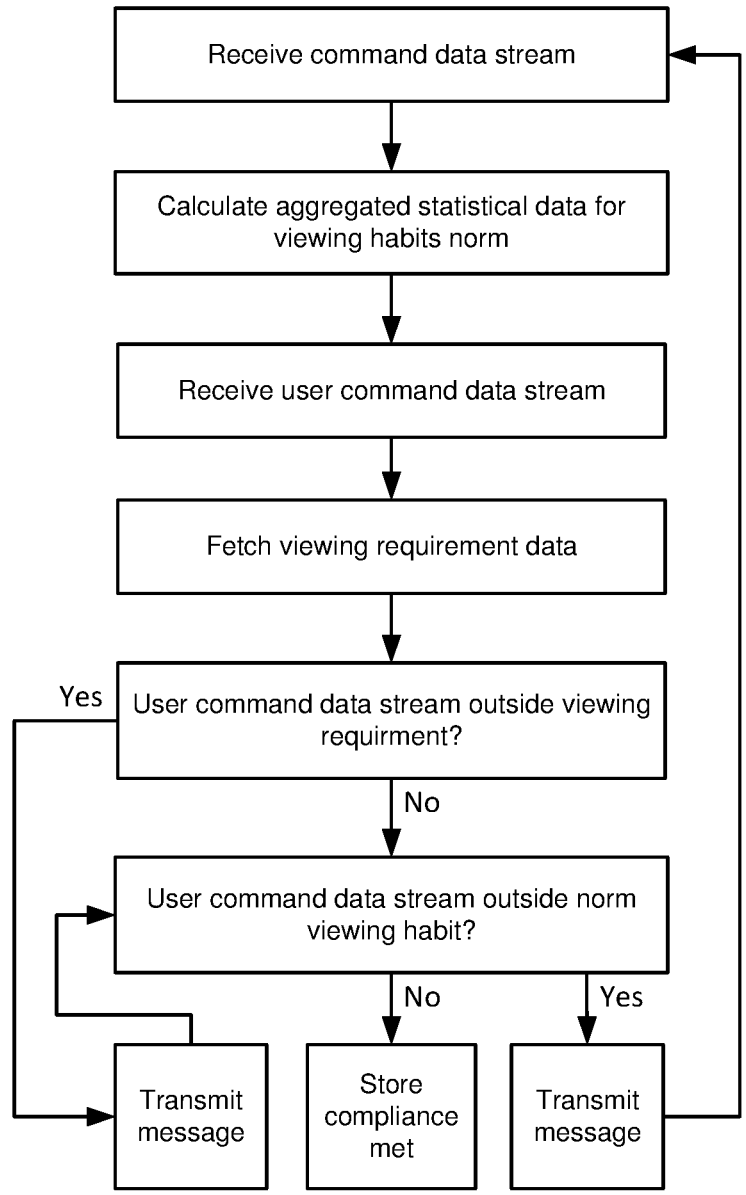
FIG. 4 Flow chart for automatically monitoring user viewing habit.
Figure 5:
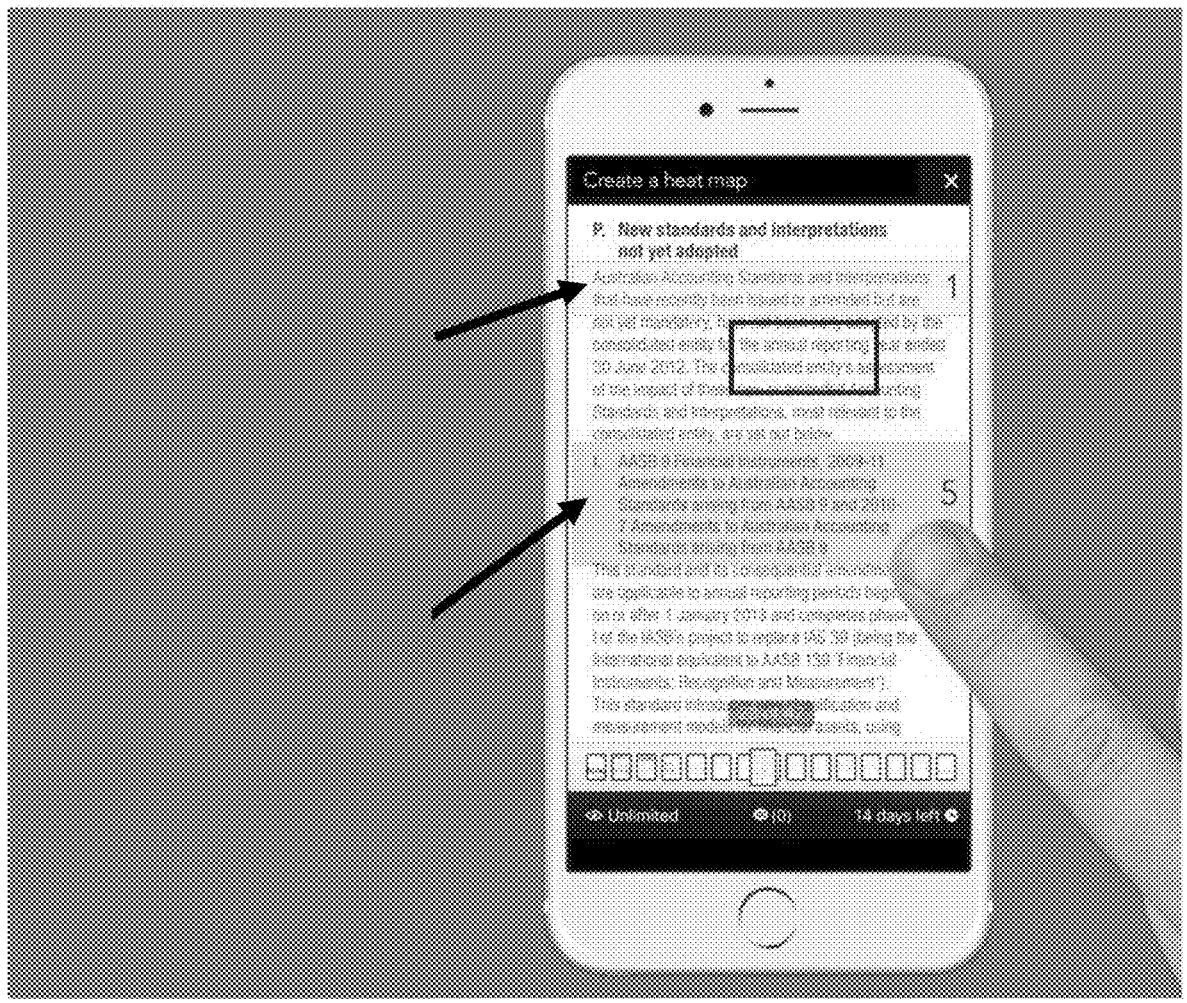
FIG. 5 Depiction of the bounding boxes on a document.
Figure 6:
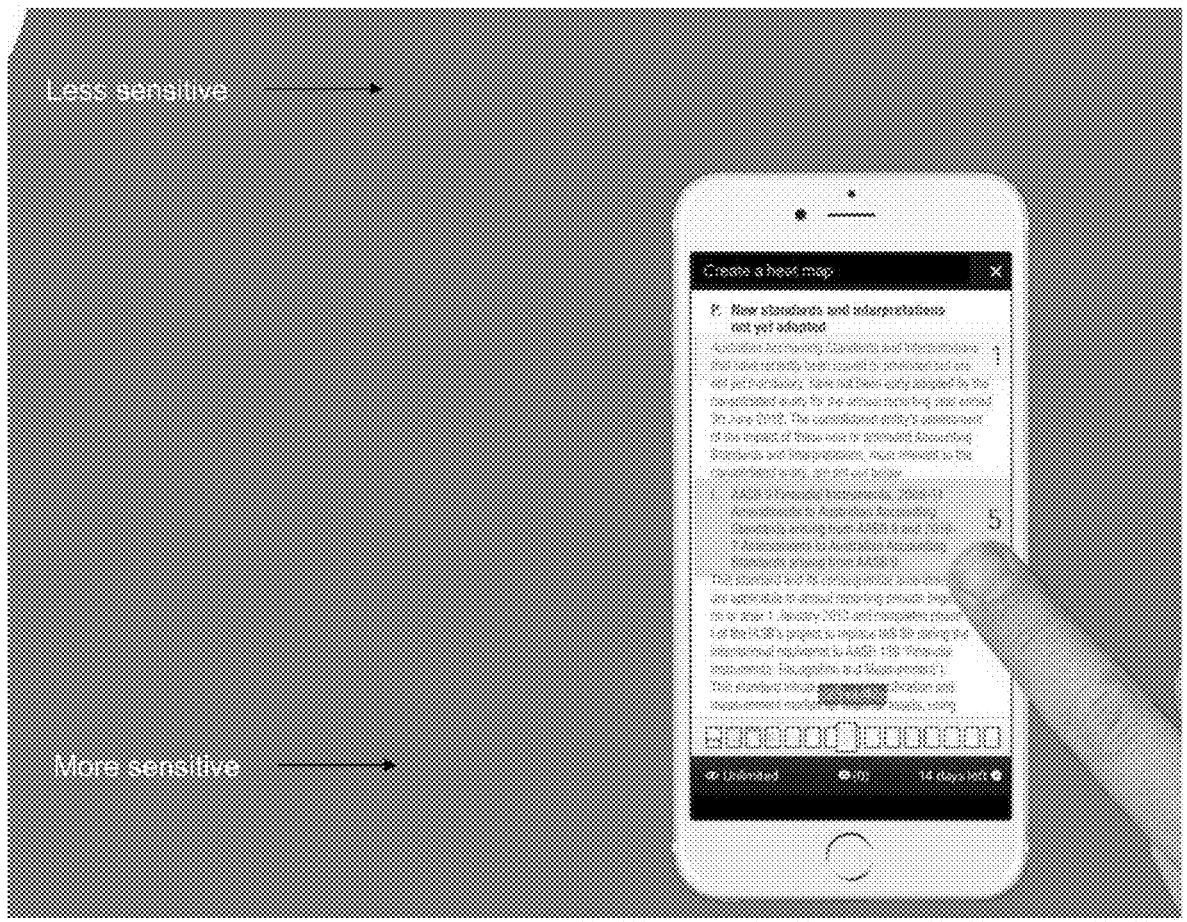
FIG. 6 Depiction of color coding document region sensitivity.
Figure 7:
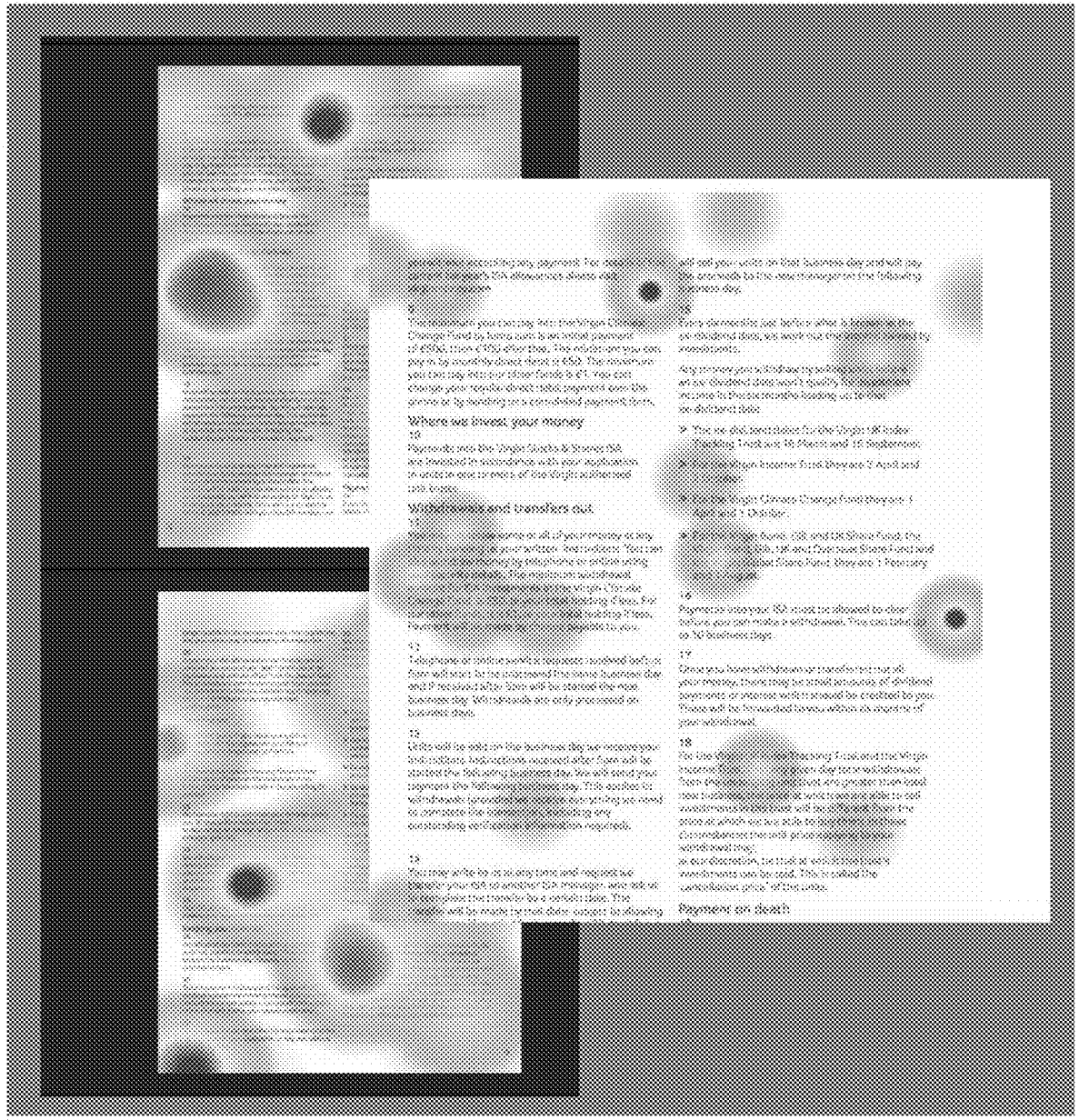
FIG. 7 Depiction of usage heatmap color coding overlaying the document.
Figure 8:
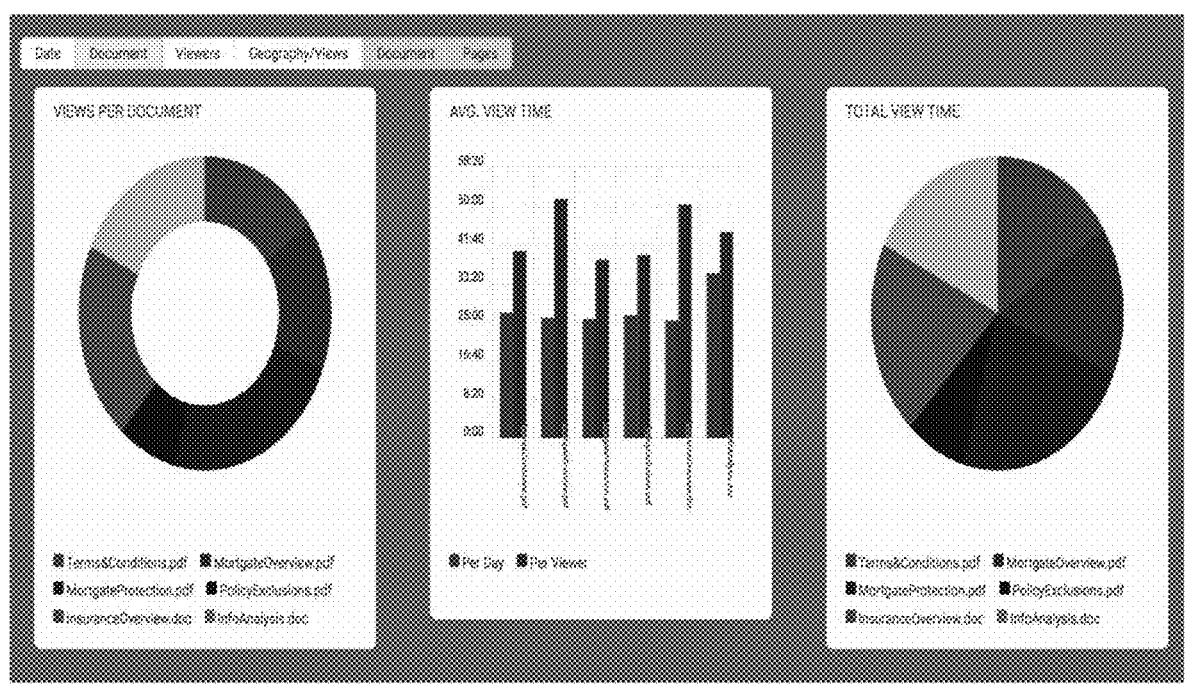
FIG. 8. Depiction of presentation of aggregated viewing statistics.
Figure 9:
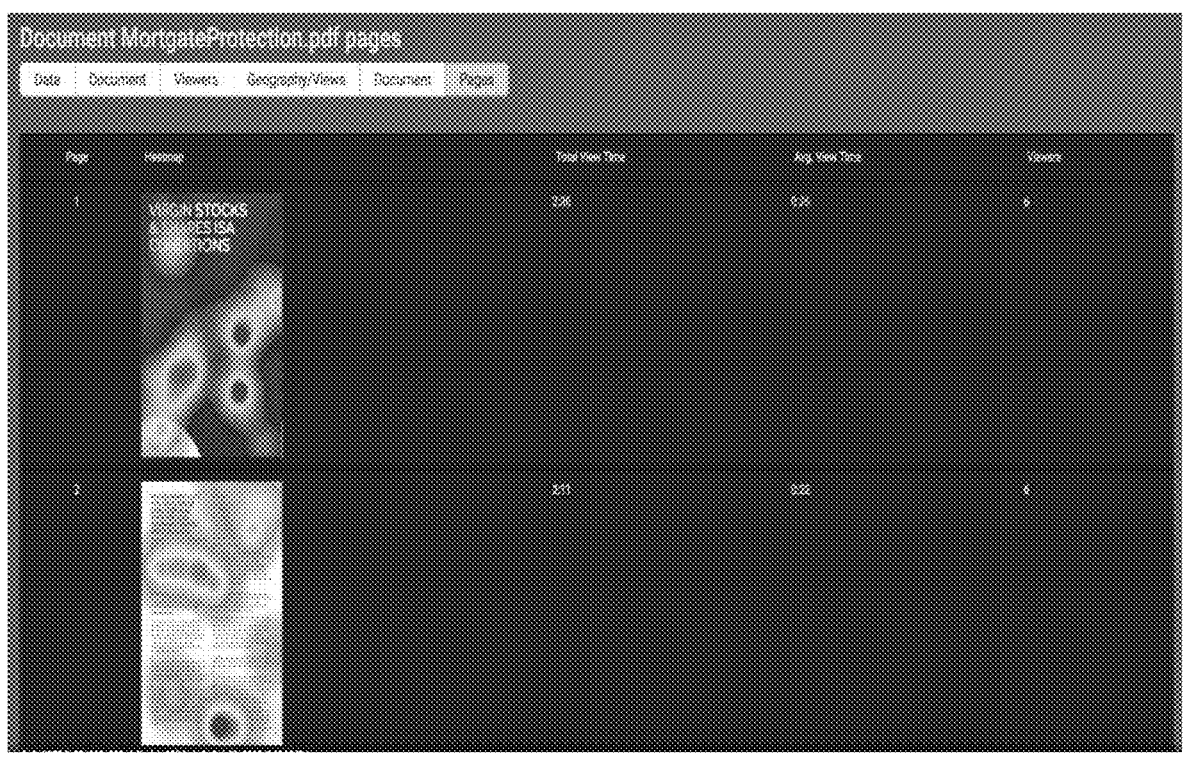
FIG. 9. Depiction of document heat map presentation.
Figure 11:
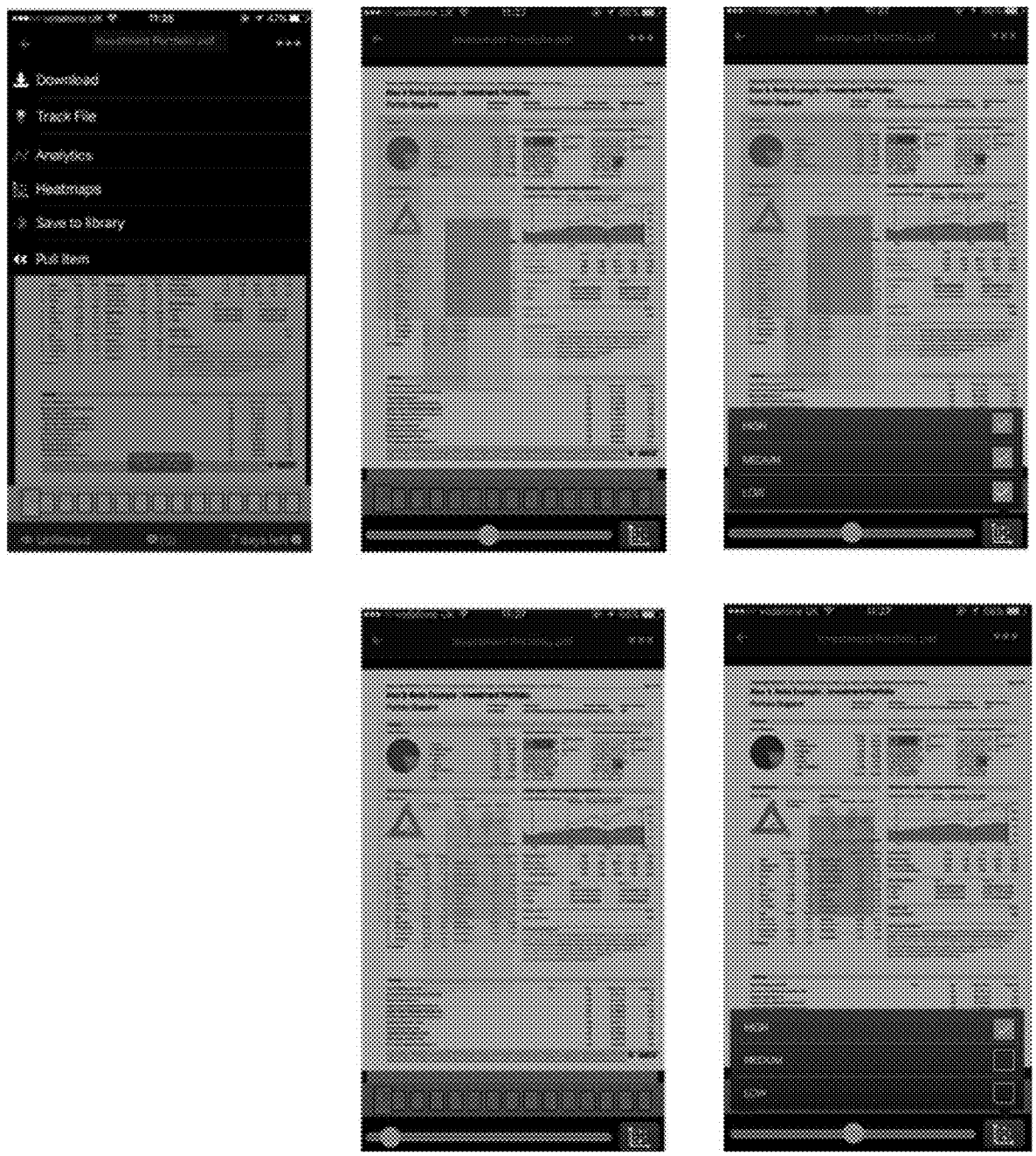
FIG. 11 depicts the increasing degrees of heatmaps in a document.
Figure 12:
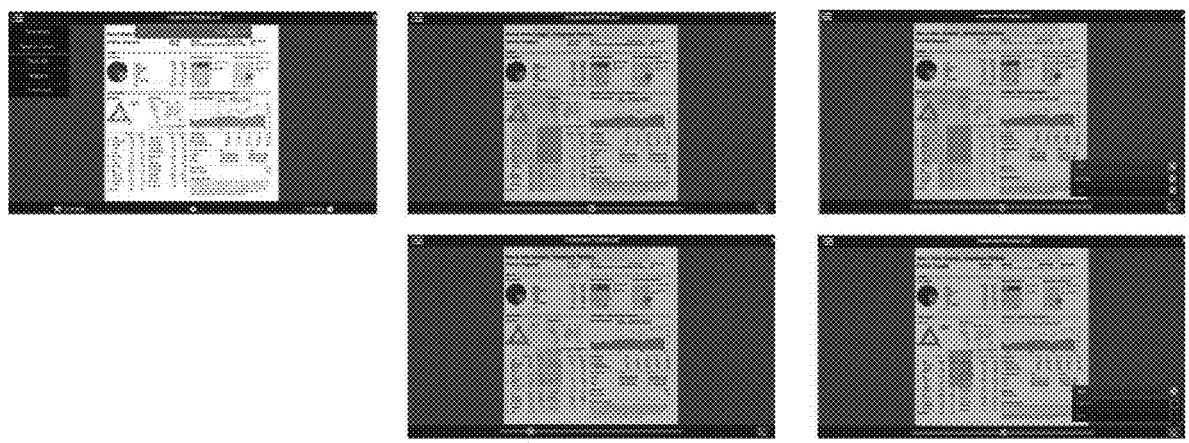
FIG. 12 depicts the increasing degrees of heatmaps in a document
Figure 13:
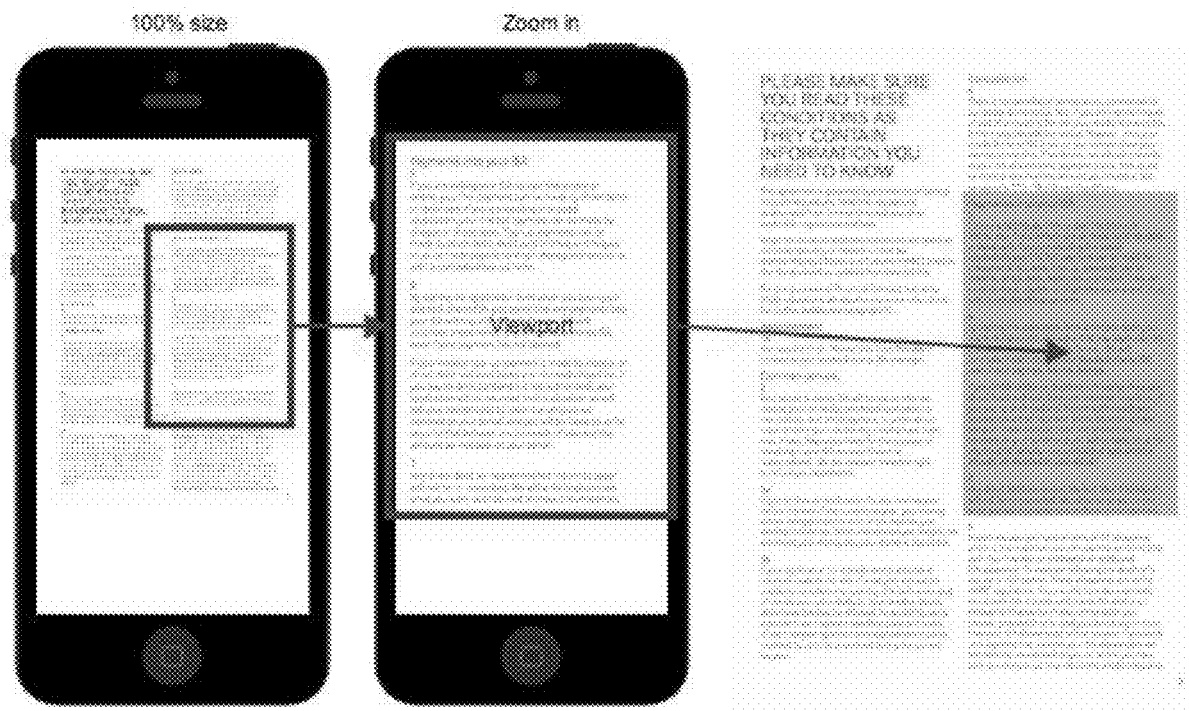
FIG. 13 depicts the zoomed-in function in a particular document.
Figure 14:
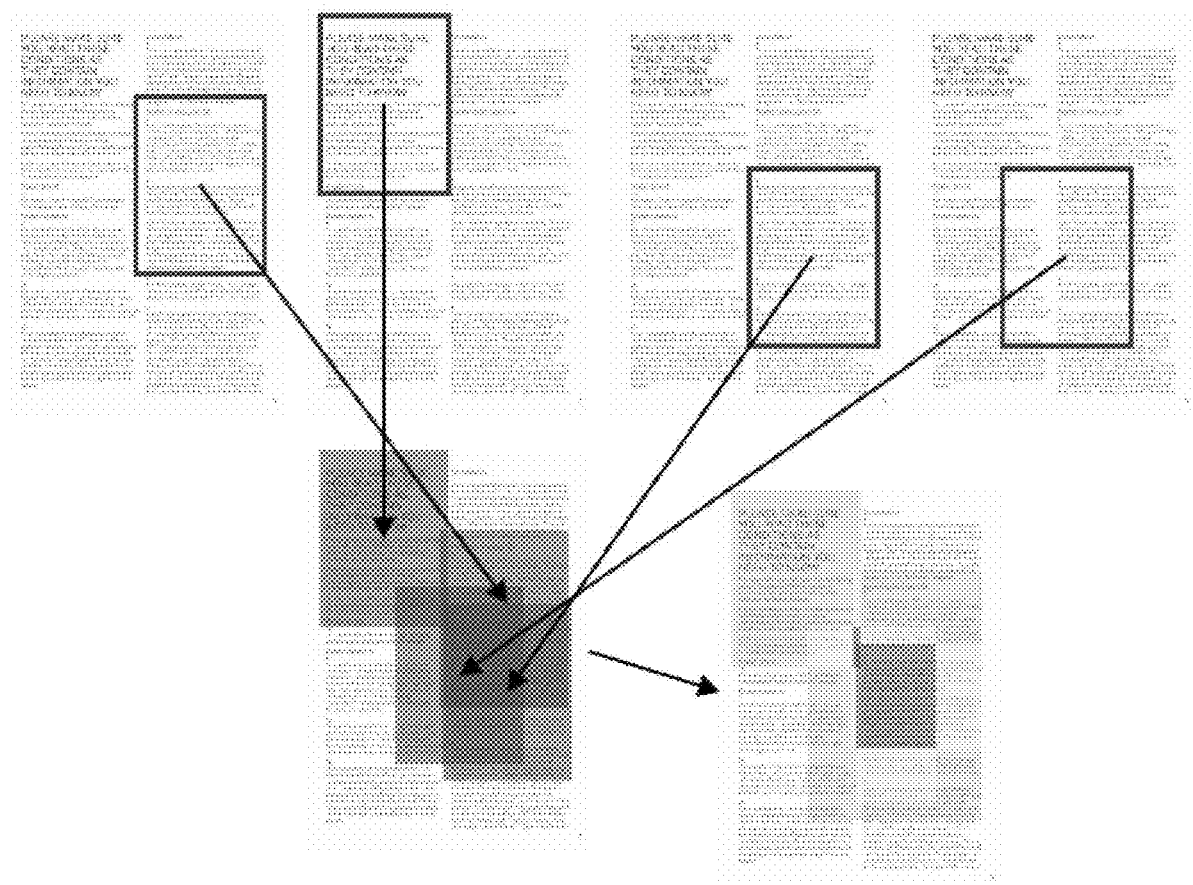
FIG. 14 depicts the different instances of viewing as indicated by different bounding lines.

Heat maps indicate how a document has been viewed. Heat maps displays vital data about document usage, including data on clicks, touches and zoom-ins. For instance, heat maps offer the ability to determine where viewers of content zoom into text or images and then identify areas the viewers find more interesting. The heatmap has many intended uses, including, without limitation, sales, marketing and detecting fraud. The system collects usage data as a document is being viewed and stores and aggregates the data in order to create a heat map, which is a graphical depiction of usage. In some embodiments, the usage indicated may be related to a single viewer of a document. In other embodiments, the usage indicated may be related to a plurality of viewers, aggregated together. Additionally, heat maps present insight about where users are focusing in on documents, and how long they are viewing the document or specific part of the document. As demonstrated in FIG. 5, the user selects hot spot boxes with their finger or the mouse pointer. The user presses the area and it changes color to reflect the sensitivity of the area, as shown in FIG. 4. The color changes to red which indicates the area is "hot" or more sensitive. The colors of the heatmap will change to reflect the amount of time spent viewing a specified document or specified portion of the document. In order to present data regarding click and touches, the system uses a data list array of points x and y. To represent zoom ins, heat maps based on rectangles are list arrays x, y, width and height. As demonstrated in FIG. 7, the data can be used for analytics to show where the user zooms into text. The pages can be zoomed to show more detail on areas of interest for viewers. The intensity of the color in the display of the heatmap comes from aggregation, indicating more time spent viewing, or more viewers looking at that section.

The heat-map can be used to show analytics through content with overlays of colors of interest. Additionally, gathering datasets can be used for machine learning—storing the data to be used for datasets for future machine learning to predict viewer behavior. If a heatmap is triggered, an API event can trigger functions in other internal or external systems. Data is collected by a user sending the server log data about tracked events on files. The system then aggregates, reduces and filters the collected data in order to expose the data to analytics dashboards. The aggregated data is then presented on top of each page, image and/or slide mockup. In one embodiment, the opacity may be edited on the heatmap: for example, User A pushes content to User B, User B opens the content and zooms-in on a portion of the document. User A can then select "heatmaps" from the analytics menu, and be presented with heatmap analytics of the pushed content, that is, the usage of the document by User B. The default setting is 50% opacity level, but User A can toggle the opacity bar to make the heatmap lighter or darker in order to read the content behind the heatmap. Opacity can be set as a parameter that is used to modify pixel values that are displaying the document on the screen. For example, white pixels representing background behind text characters may be shifted toward a red value by a color scaling vector that shifts the color vector of the pixel or an additive offset increasing the amount of red as compared to the green and blue values. The same would apply for the other colors. The amount of the opacity is determined by the amount of the scaling or offset.

In a second embodiment, the heatmap level can be selected as low, medium or high. For example, User A pushes content to User B. User B opens the content and zooms in to focus on a portion of the document. User A can then select heatmaps from the user option, and de-select the pre-selected level (low/medium/high) to remove that level from view.

In the preferred embodiment, User B, who is viewing the document, will operate their remote device by using their fingers or touchpad to navigate through the document. The user may input commands that navigate to a page or location in the document. The user may input commands to zoom into a particular section. The user's device will store these commands as they are executed, and forward the command sequence to the server. This can be done in real-time, or stored and transmitted to the server as a batch. Alternatively, the usage statistics may be calculated on the remote device and transmitted to the server or directly back to User A's device. The commands may also have a timestamp indicating when the command was input into the device. This sequence of commands can be stored in a data structure that represents the user's viewing session of the document. That data may be converted into a heatmap image. In one embodiment, the time period between commands may be determined by subtracting time stamps. This interval value can represent a period of time spent viewing a particular location in the document. The interval value may be multiplied by a scaling constant and that output mapped to a color. In this manner, a region that has been selected that is determined to have a long time period before the next command can be viewed as "hotter" than one where the period of time is short. Similarly, behavior of an aggregate of users may be depicted by averaging or otherwise combining the interval times and then mapping that output using color to indicate total average time viewed or total time viewed. In another embodiment, the amount of interval time for a particular region can be increased if the user revisits the document and the location in the document again. Other parameters may be utilized as commands that may be counted. For example, the number of times that a user touches the screen at a region in the displayed document can be calculated. In this embodiment, the system can utilize x,y locations and calculate a tolerance band around the point such that any touch within that tolerance band is tallied as a touch of that x,y point. Similarly, bounding boxes may be used instead. Each time a user or users touch the device screen or touchpad (or use a mouse to select) at a location on a displayed page in the document, as represented on the display, that location on the display can be mapped to the actual location data point in the document. The mapping can be accomplished by utilizing the actual location on the screen, the zoom factor and the location in the document that corresponds to the center point of the screen or some other predetermined reference (i.e. one of the corners, for example). An scaling factor and offset can be used to convert the actual location on the screen to the location on the page in the document. That actual location data point in the document is a page, and then an x, y coordinate, if Cartesian coordinates are used. Other coordinate systems may be used, but in the preferred embodiment, with rectangular pages, Cartesian coordinates are preferred. As a user touches the screen, the locations and times are stored. Bounding boxes that represent sections of the document can be predefined, by a reference, a page, a height and width, and an x,y location of one corner. The system can detect touches, determine the location and page in the document and then determine which bounding box the touch was in by determining which box encompasses the touch location. As touches are detected, a tally for each bounding box is updated. Using either a single user or multiple users, the bounding boxes can be used to generate a heat map image showing where one person's viewing activity was concentrated, or a group of persons viewing activity.

In-app analytics may be provided by a function that presents the User A the option of viewing analytics that introduce basic analytics for all users to access via Applicant's mobile application. In one embodiment, a user can select analytics for the pushed content by selecting the menu icon, and select the "analytics—track file' tab from the pull-down menu.

Figure 15:
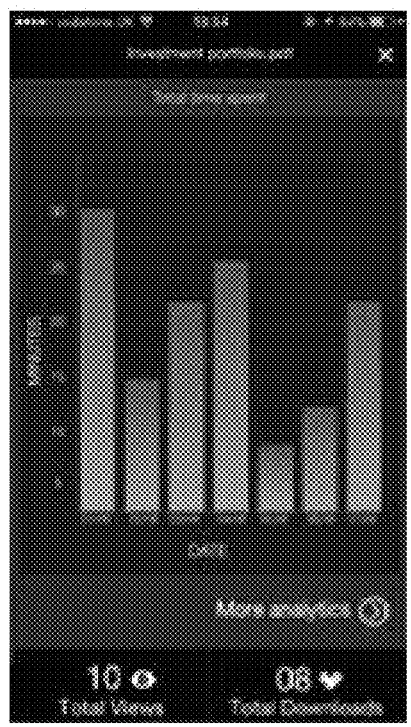
FIG. 15 depicts the total time spent on a document by a receiving user over the last seven days

In a second embodiment, as represented in FIG. 15, the user is presented analytics representing the total time a receiving user spent on the pushed document over the last seven days. In the graphical representation, below, the days are presented on the x-axis and the time is shown on the y-axis. This analytic shows for a set of predetermined time intervals, the number of times the document was open.

In a third embodiment, a user is presented with analytics representing time a receiving user spent viewing a pushed image.

Figure 16:
FIG. 16 depicts a graph indicating the time a receiving user spent per page over the last seven days

In a fourth embodiment, represented by FIG. 16, a user is presented with a graph representing the amount of time spent by a receiving user on pages such as PowerPoint® presentations and Microsoft Word®. The user may view this graph by selecting the "More analytics" tab in the drop down menu. The graph presents the total time the receiving user spent on the pushed file per day over the last seven days.

Figure 17:
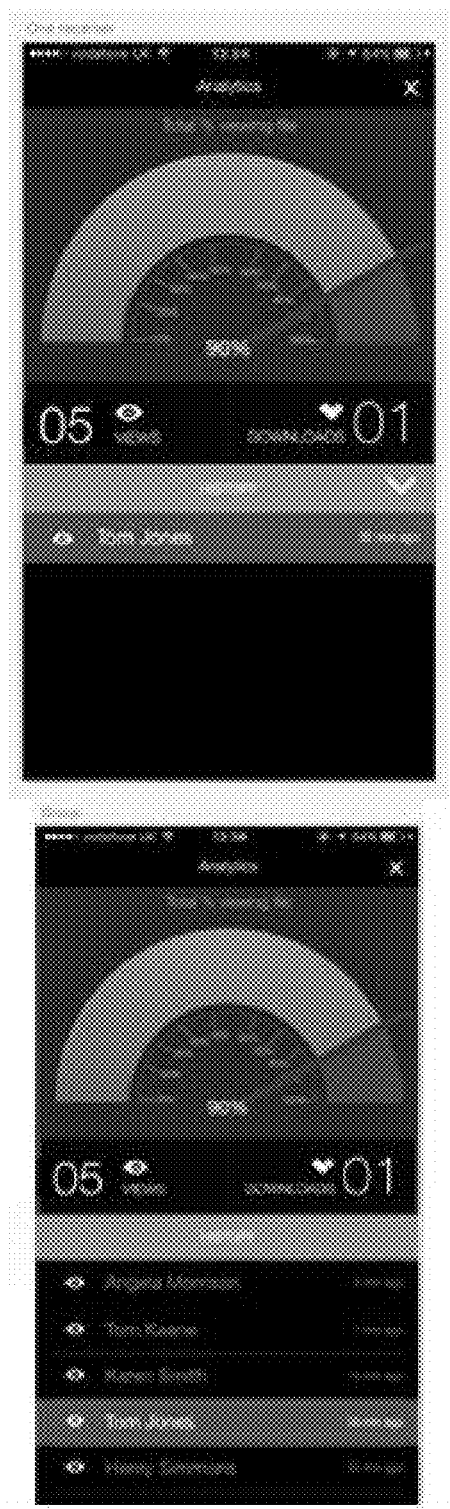
FIG. 17 depicts a graph showing the amount of time a receiving user spent viewing a video or audio file

In a fifth embodiment, represented by FIG. 17, a user is presented with a graph representing the amount of time a receiving user spent viewing video or sound files, such as mp3 or mp4 files. If a ten-minute video is viewed once for one minute, the gauge graph will show 10%. Alternatively, if the video is viewed a second time for seven minutes, the gauge will show 70%.

Operating Environment: The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the website can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A system comprised of a server computer in communication with a database and a remote device operated by a user for analyzing the viewing habits of the user of a document comprising:
   a subsystem operating on the remote device adapted by logic to display at least a portion of the document on a display screen of the remote device;
   a subsystem operating on the remote device adapted by logic to detect and store viewing commands input by the user for adjusting the apparent location in the document or apparent magnification of the viewing screen;
   a subsystem operating on the remote device adapted by logic to transmit to the server the viewing command stream of the user; and
   a database comprised of data that represents the aggregated viewing command streams of a plurality of users for a plurality of predefined regions in the document as an N dimensional region in an N dimensional space, where N is the number of predefined regions in the plurality.

2. The system of claim 1 further comprising:
   a subsystem adapted by logic to convert the viewing command stream of the user into at least one heatmap image representing the user viewing command stream for at least one corresponding page of the displayed document.

3. The system of Claim 1 further comprising:
   a subsystem adapted by logic to receive the user viewing command stream, generate an N dimensional vector from such command stream and determine whether the N dimensional vector is located within the N dimensional region, or within a predetermined distance from the boundary of the N dimensional region.

4. The system of claim 1 further comprising:
   a database comprised of data representing the aggregated viewing habits of a plurality of users of the document.

5. The system of claim 4 further comprising:
   a subsystem adapted by logic to convert the aggregated viewing habits data into at least one heatmap image representing the aggregated user viewing command stream for at least one corresponding page of the displayed document.

6. The system of claim 1 further comprising:
   a subsystem operating on the server to receive the user viewing command stream and determine whether the user viewing command stream meets a predetermined viewing requirement test.

7. The system of claim 1 further comprising:
   a subsystem adapted by logic to convert the received viewing command stream data from the user into at least one heatmap image representing the user's viewing behavior for at least one corresponding page of the displayed document and store the at least one heatmap image.

8. The system of claim 7 further comprising:
   a database comprised of a data record that relates the at least one heatmap image with the document and the user.

9. A system for tracking the viewing habits of a plurality of viewers with regard to an electronic document displayed on the viewers' remote computing device comprising:
   a subsystem adapted by logic to receive and display at the remote computing device an electronic document;
   a subsystem adapted by logic to receive and store at a server, data representing one or more commands input into the user interface of the remote computing device for navigating the viewing of the document;
   a subsystem adapted by logic to calculate an aggregated viewing habit metric associated with the plurality of viewers and the document, from the stored input command data;
   a subsystem adapted by logic to determine an N-space locus associated with the aggregated viewing command stream for a subset of the plurality of viewers for a particular document;
   a subsystem adapted by logic to determine an N-space vector associated with one of the plurality of viewers; and
   a subsystem adapted by logic to determine if the particular viewer's N-space vector is located within the determined N-space locus or within a variance threshold of such N space locus.

10. The system of claim 9 further comprising:
    a subsystem comprised of logic to receive a navigation command stream data from one of the plurality of viewer's computing device with regard to a predetermined document; and to
    determine if the received navigation command stream indicates a viewing habit of the one of the plurality of viewers that is within a tolerated variation threshold of the aggregated viewing habit metric.

11. The system of claim 9 further comprising:
    a subsystem comprised of logic to receive metadata associated with a document that defines bounding boxes within the document; and
    a subsystem comprised of logic to use the command stream of a particular one of the plurality of viewers to determine if the one viewer has input navigation commands that moved an apparent viewing window of the document to a location within a region overlapping at least one of the defined bounding boxes.

12. The system of claim 9 further comprising:
    a subsystem comprised of logic to convert aggregated viewing habit data associated with the plurality of viewers and the document into a graphical image, said image comprised of at least one colored region that uses a predetermined mapping of colors to a range of viewing habit amount of that viewer in that region, and the location of the colored region corresponds to the location of the region in the document.

13. The system of claim 9 further comprising:
    a viewing program resident on the remote device adapted by logic to display the received electronic document in an apparent window and respond to the input command stream so as to move the apparent window in response to said command stream to at least one location within the document and to display that location in the apparent window.

14. The system of claim 9 further comprising:
    a database operatively connected to the system by a data network in combination with a server, said database adapted by logic to store data records that associate the viewer, the document and the viewing command data input by the viewer into the remote device while viewing the document.

15. The system of claim 9 further comprising:
    a subsystem adapted by logic to receive a navigation command stream data from one of the plurality of viewer's computing device with regard to a predetermined document; and determine if the received navigation command stream indicates a viewing habit of the one of the plurality of viewers that is within a tolerated variation threshold of a predetermined viewing habit metric requirement.

16. The system of claim 9 further comprising:
a subsystem adapted by logic to receive a navigation command stream data from one of the plurality of viewer's computing device with regard to a predetermined document; and
determine if the received navigation command stream indicates a viewing habit of the one of the plurality of viewers that is outside a tolerated variation threshold of a predetermined viewing habit metric requirement.

17. A method executed by a server computer in communication with a database and a remote device operated by a user for analyzing the viewing habits of the user of a document comprising:
displaying at least a portion of the document on a display screen of the remote device;
detecting and storing viewing commands input by the user for adjusting the apparent location in the document or apparent magnification of the viewing screen; and
transmitting to the server the viewing command stream of the user; and
storing a database comprised of data that represents the aggregated viewing command streams of a plurality of users for a plurality of predefined regions in the document as an N dimensional region in an N dimensional space, where N is the number of predefined regions in the plurality.

18. The method of claim 17 further comprising:
receiving the transmitted viewing command stream; and
converting the viewing command stream of the user into at least one heatmap image representing the user viewing command stream for at least one corresponding page of the displayed document.

19. The method of claim 17 further comprising:
receiving the user viewing command stream;
generating an N dimensional vector from such command stream; and
determining whether the N dimensional vector is located within the N dimensional region, or within a predetermined distance from the boundary of the N dimensional region.

20. The method of claim 17 further comprising:
storing a database comprised of data representing the aggregated viewing habits of a plurality of users of the document.

21. The method of claim 20 further comprising:
converting the aggregated user viewing command stream into at least one heatmap image representing the aggregated viewing habit of a plurality of users for at least one corresponding page of the displayed document.

22. The method of claim 17 further comprising:
receiving the user viewing command stream; and
determining whether the user viewing command stream meets a predetermined viewing requirement test.

23. A method for tracking the viewing habits of a plurality of viewers with regard to an electronic document displayed on the viewers' remote computing device comprising:
receiving and displaying at the remote computing device an electronic document;
receiving and storing at a server, data representing one or more commands input into the user interface of the remote computing device for navigating the viewing of the document;
calculating an aggregated viewing habit metric associated with the plurality of viewers and the document, from the stored input command data;
determining an N-space locus associated with the aggregated viewing command stream for a subset of the plurality of viewers for a particular document;
determining an N-space vector associated with one of the plurality of viewers; and
determining if the one viewer's determined N-space vector is located within the determined N-space locus or within a variance threshold of such N-space locus.

24. The method of claim 23 further comprising:
receiving a navigation command stream data from one of the plurality of viewer's computing device with regard to a predetermined document; and
determining if the received navigation command stream indicates a viewing habit of the one of the plurality of viewers that is within a tolerated variation threshold of the aggregated viewing habit metric.

25. The method of claim 23 further comprising:
receiving metadata associated with a document that defines bounding boxes within the document; and
using the command stream of a particular one of the plurality of viewers to determine if the one viewer has input navigation commands that moved the apparent viewing window of the document to a location within a region overlapping at least one of the defined bounding boxes.

26. The method of claim 23 further comprising:
converting aggregated viewing habit data associated with the plurality of viewers and the document into a graphical image, said image comprised of at least one colored region that uses a predetermined mapping of colors to a range of viewing habit amount of that viewer in that region, and the location of the colored region corresponds to the location of the region in the document.

27. The method of claim 23 further comprising:
displaying using a viewing program resident on the remote device the received electronic document in an apparent window; and
responding to the received data representing one or more commands so as to move the apparent window in response to said data to at least one location within the document in order to display that location in the apparent window.

28. The method of claim 23 further comprising:
storing in a database data records that associate the viewer, the document and the viewing command data input by the viewer into the remote device while viewing the document.

29. The method of claim 26 further comprising:
receiving a navigation command stream data from one of the plurality of viewer's computing device with regard to a predetermined document; and
determining if the received navigation command stream indicates a viewing habit of the one of the plurality of viewers that is outside a tolerated variation threshold of a predetermined viewing habit metric requirement.

30. The method of claim 23 further comprising:
converting the received viewing command stream data from the user into at least one heatmap image representing the user's viewing behavior for at least one corresponding page of the displayed document and storing the at least one heatmap image.

31. The method of claim 30 further comprising:

storing in a database a data record that relates the at least one heatmap image with the document and the user.

* * * * *